(12) United States Patent
Schitter et al.

(10) Patent No.: US 11,614,614 B2
(45) Date of Patent: Mar. 28, 2023

(54) RELUCTANCE ACTUATOR

(71) Applicant: MICRO-EPSILON MESSTECHNIK GMBH & CO. KG, Ortenburg (DE)

(72) Inventors: Georg Schitter, Vienna (AT); Ernst Csencsics, Lanzendorf (AT); Johannes Schlarp, Vienna (AT); Tobias Schopf, Triftern (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 232 days.

(21) Appl. No.: 16/484,626

(22) PCT Filed: Feb. 8, 2018

(86) PCT No.: PCT/DE2018/200009
§ 371 (c)(1),
(2) Date: Aug. 8, 2019

(87) PCT Pub. No.: WO2018/145704
PCT Pub. Date: Aug. 16, 2018

(65) Prior Publication Data
US 2020/0041781 A1 Feb. 6, 2020

(30) Foreign Application Priority Data

Feb. 10, 2017 (DE) .................... 10 2017 202 182.9

(51) Int. Cl.
G02B 26/08 (2006.01)
G02B 26/10 (2006.01)
H01F 7/14 (2006.01)

(52) U.S. Cl.
CPC ......... G02B 26/085 (2013.01); G02B 26/101 (2013.01); H01F 7/14 (2013.01)

(58) Field of Classification Search
CPC .............. G02B 26/085; G02B 26/101; G02B 26/0816; H01F 7/14; H02K 37/02; H02K 2201/18
(Continued)

(56) References Cited

U.S. PATENT DOCUMENTS 6,828,698 B2 * 12/2004 Hatam-Tabrizi ..... G02B 26/085
310/12.01
6,906,848 B2 6/2005 Aubuchon
(Continued)

FOREIGN PATENT DOCUMENTS

CN 103828012 A 5/2014
EP 2561523 2/2013
(Continued)

OTHER PUBLICATIONS

Hafez et al. | "Design and simulations and experimental and investigations of a compact single mirror tip/tilt laser scanner," Mechatronics, vol. 10, pp. 741-760, 2000.
(Continued)

*Primary Examiner* — Euncha P Cherry
(74) *Attorney, Agent, or Firm* — FisherBroyles, LLP; Jason P. Mueller

(57) ABSTRACT

A disclosed reluctance actuator includes a magnetizable stator, at least one coil, and a yoke. The coil is configured to generate a magnetic field in the stator and the yoke is configured to partially close the magnetic flux of the stator. The yoke is further configured as a movable element that performs lifting/tilting movements. An actuator system including a non-magnetic housing and a reluctance actuator is also disclosed. In the actuator system, the reluctance actuator may be at least partially located in the non-magnetic housing. A method of performing lifting/tilting movements of the yoke of a reluctance actuator is also disclosed. The method includes controlling a current in the at least one coil
(Continued)

of the reluctance actuator to thereby generate a magnetic field in the stator. The magnetic field generates a lifting/tilting movement of the yoke due to interaction between the magnetic field and the yoke.

38 Claims, 8 Drawing Sheets

(58) Field of Classification Search
USPC ...................................................... 359/197.1
See application file for complete search history.

(56) References Cited

U.S. PATENT DOCUMENTS

| | | | |
|---|---|---|---|
| 2002/0171413 A1* | 11/2002 | Ikegame | G01R 15/188 |
| | | | 324/96 |
| 2007/0018604 A1 | 1/2007 | Montesanti et al. | |
| 2008/0310001 A1 | 12/2008 | Bernstein | |
| 2013/0076462 A1* | 3/2013 | Gassmann | H01F 7/14 |
| | | | 335/84 |
| 2014/0022655 A1 | 1/2014 | Cheng et al. | |
| 2016/0178894 A1 | 6/2016 | Rose et al. | |
| 2016/0233012 A1* | 8/2016 | Lubinski | H01F 41/02 |

FOREIGN PATENT DOCUMENTS

| | | |
|---|---|---|
| JP | S4947663 B1 | 12/1974 |
| JP | 2000232699 A | 8/2000 |
| JP | 2002505789 A | 2/2002 |
| JP | 2009542174 A | 11/2009 |
| WO | 2005026817 A1 | 3/2005 |
| WO | 2009/005157 A1 | 1/2009 |
| WO | 2011/131167 A2 | 10/2011 |
| WO | 2015/047343 A1 | 4/2015 |
| WO | 2016/124782 A1 | 8/2016 |

OTHER PUBLICATIONS

Tapos et al.| "High bandwidth fast steering mirror," Optomechanics 200, Proceedings of SPIE vol. 5877, 2005.

Boulet | "Design of a small fast steering mirror for airborne and aerospace applications," Master's Thesis, Massachusetts Institute of Technology, 2008.

Long et al. | "Modeling and analysis of a novel two-axis rotary electromagnetic actuator for fast steering mirror," Journal of Magnetics, vol. 19, No. 2, pp. 130-139, 2014.

* cited by examiner

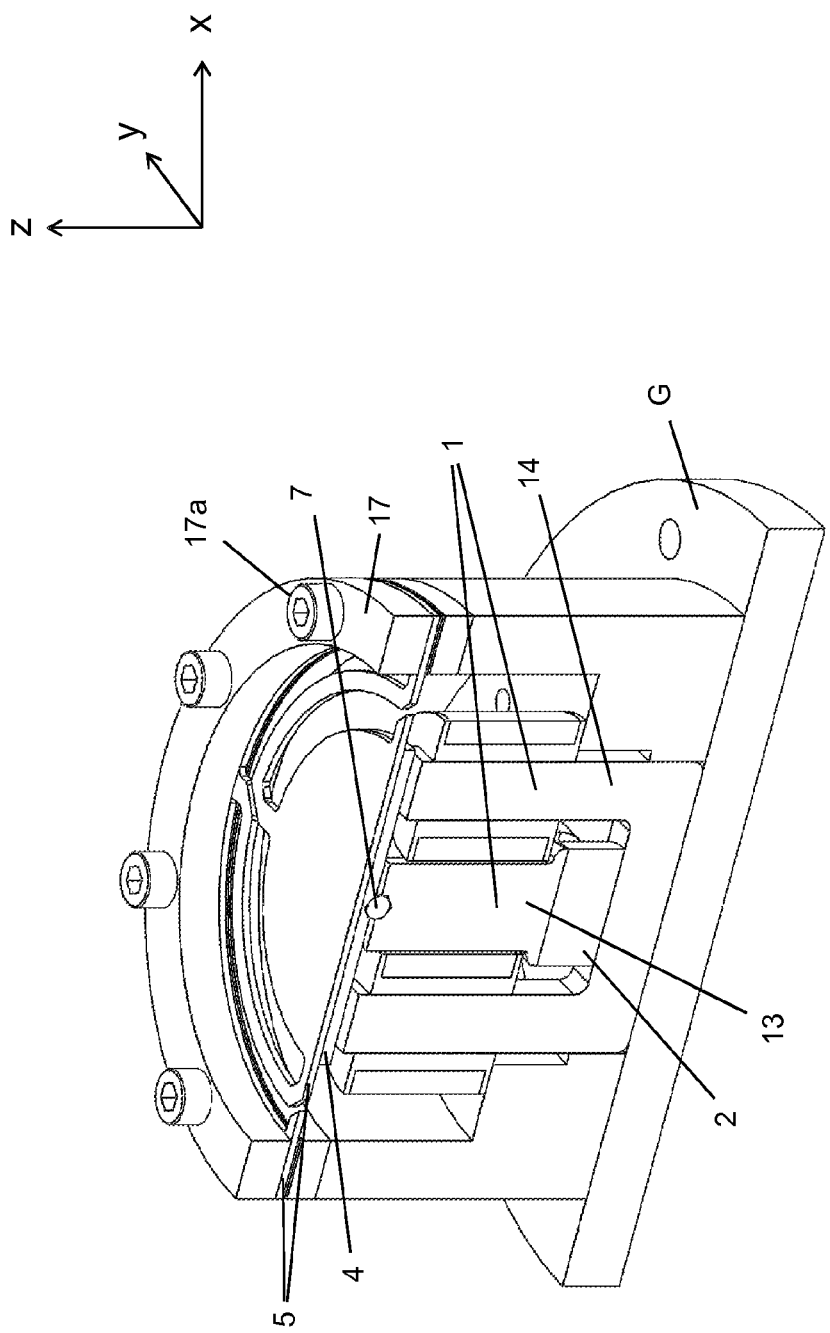

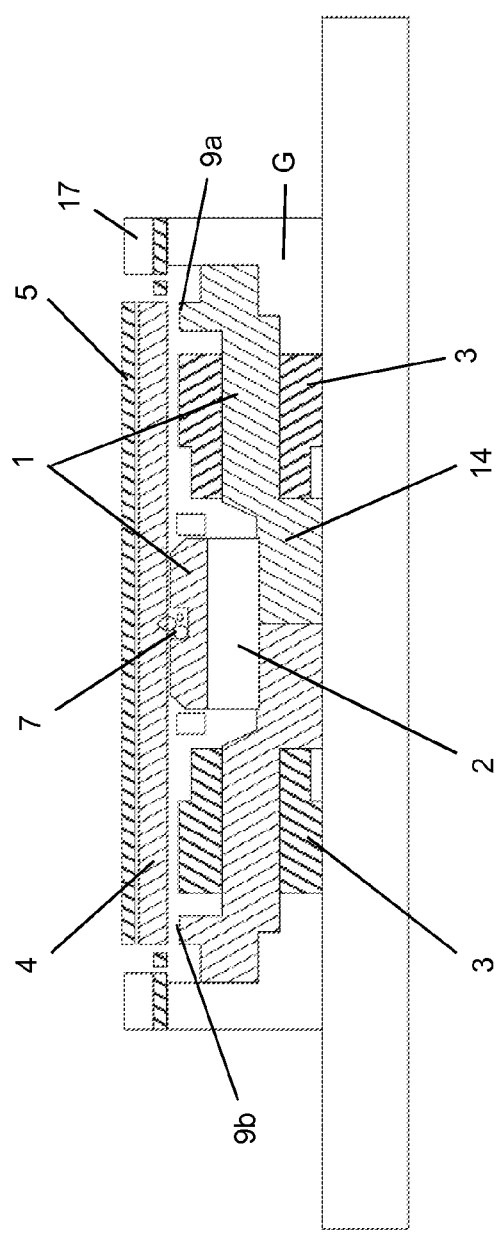

RELUCTANCE ACTUATOR

CROSS-REFERENCE TO RELATED APPLICATIONS

This application is a national stage entry under 35 U.S.C. 371 of PCT Patent Application No. PCT/DE2018/200009, filed Feb. 8, 2018, which claims priority to German Patent Application No. 10 2017 202 182.9, filed Feb. 10, 2017, the entire contents of each of which are incorporated herein by reference.

FIELD

This disclosure relates to a reluctance actuator, including a magnetizable stator, at least one coil, which is configured for generating a magnetic field in the stator, and a yoke for at least partially closing the magnetic flux of the stator.

The invention further relates to an actuator system including a reluctance actuator.

The invention further relates to a method for performing lifting and tilting movements of a movable element of a reluctance actuator.

Although applicable to any type of system, the disclosure is described with respect to actuator systems for optical components

BACKGROUND

Known opto-mechanical lifting/tilting systems, for example fast steering mirrors (FSM) may be employed in a multitude of applications. Other known actuator systems are based on Lorentz actuators, as have become known, for example, from non-patent literature publication M. Hafez, T. Sidler, R. Salathe, G. Jansen, and J. Compter, "Design and simulations and experimental and investigations of a compact single mirror tip/tilt laser scanner," Mechatronics, vol. 10, pp. 741-760, 2000 or on piezo actuators, for example known from non-patent literature publication F. M. Tapos, D. J. Edinger, T. R. Hilby, M. S. Ni, B. C. Holmes, and D. M. Stubbs, "High bandwidth fast steering mirror," Optomechanics 200, Proceedings of SPIE Vol. 5877, 2005.

Actuators based on Lorentz actuators are used in systems having a large scan range—up to two degrees—but a limited bandwidth, just several 100 Hz. Piezo actuators, on the contrary, are used in systems having a high bandwidth—up to several kHz—but smaller scan ranges, typically just a few mrad.

Reluctance actuators have a higher force density than Lorentz actuators and larger scan ranges than piezo actuators. Reluctance actuators are used in the most varied fields of application, e.g. for rotational movements of fast steering mirror systems.

It is a disadvantage, however, that the two different actuator pairs are arranged around the movable element for tilting about two axes, which allows rapid acceleration of the movable element, but increases the actuator installation space considerably and considerably limits the maximum achievable optical angle (of deflection). Other reluctance actuators have become known, for example, from non-patent literature publications M. Boulet, "Design of a small fast steering mirror for airborne and aerospace applications," Master's Thesis, Massachusetts Institute of Technology, 2008 and Y. Long, C. Wang, X. Dai, X. Wei, and S. Wang, "Modeling and analysis of a novel two-axis rotary electromagnetic actuator for fast steering mirror," Journal of Magnetics, vol. 19, no. 2, pp. 130-139, 2014.

All these known reluctance actuators share the disadvantage that the four different actuators, or two actuator pairs, respectively, are arranged around the movable element and thus considerably increase the installation space while at the same time considerably limiting the maximum achievable optical angle (of deflection). This ultimately limits the potential applications and uses considerably.

It is therefore a problem of the disclosure to provide a reluctance actuator which on the one hand has a compact design and on the other hand is flexibly usable, and in addition allows a high bandwidth and great deflection and at the same time is highly reliable.

SUMMARY

This disclosure solves the problem mentioned above in a reluctance actuator including a magnetizable stator, at least one coil, which is configured for generating a magnetic field in the stator, and a yoke for partially closing the magnetic flux of the stator in that the yoke is configured as the movable element for lifting/tilting movements.

The disclosure also solves the problem in an actuator system including a reluctance actuator in that the reluctance actuator is configured according to any one of claims 1-28 and at least partially arranged in a non-magnetic housing, e.g. an aluminum housing.

The disclosure also solves the problems mentioned above in a method for performing lifting and tilting movements of a movable element of a reluctance actuator, wherein the reluctance actuator includes a magnetizable stator, at least one coil, which is configured for generating a magnetic field in the stator, and a yoke for at least partially closing the magnetic flux in the stator in that the yoke is configured as the movable element for lifting/tilting movements and moved by controlling the magnetic field.

One of the advantages achieved with this is that an extremely compact and highly dynamic actuator can be provided, since the yoke forms a substantially outer termination of the actuator. Another advantage of this embodiment is that the movable element has a low mass when the movable element—also called a mover—consists only of yoke that closes the magnetic circuit; the actuator thus has a high bandwidth.

Another advantage of the yoke being configured as the movable element is that the movable element is not spatially arranged within the yoke that closes the magnetic circuit but forms a, specifically one-sided spatial termination of the actuator; in other words, unlike in conventional systems where the yoke is arranged in the interior, the yoke or the movable element is substantially arranged externally. The existing installation space can thus be well utilized, since there are no projections from either the yoke or the coils, for example. In other words, the movable element is arranged almost at the outermost point of the entire actuator, so no actuator component projects beyond the movable member.

Another advantage is the large, lateral, coverage of the movable element in relation to the stator and coils: the ratio of usable surface of the movable element to the overall diameter of the actuator is extremely high.

The term "movable element" should be interpreted in the broadest sense. Synonymous terms for the term "movable element" are the terms "mover" or "rotor". The movable element in the meaning of the disclosure forms a yoke to close magnetic field lines and forms, or functions as, the "mover" or "rotor". The movable element specifically does not form a core.

Other features, advantages, and example embodiments of the disclosure are described below or become apparent thereby.

Advantageously, the stator includes a permanently magnetic region. This is a simple way to generate a magnetic bias in the stator.

Expediently, the cross section of the stator is formed at least along one axis in an E shape with two outer and one inner pole pieces. An E-shaped stator allows a smaller overall diameter of the actuator compared to conventional C-shaped stators.

Advantageously, the stator is configured along two axes, which are arranged at an angle to each other, with an E-shaped cross section. This allows independent tilting about two axes in a simple and compact manner.

Expediently, the angle formed between the two axes is 90°. This allows tilting about the x and y axes.

Expediently, at least one of the coils includes a coil axis, which is substantially perpendicular to the deflection direction of the movable element, wherein the stator is at least partially arranged inside the coil. A flat design in the z direction may be advantageous for certain applications.

Advantageously, the inner pole piece of the E-shaped stator along one axis is identical to the inner pole piece along the second axis. This allows a simple and compact design. In addition, a magnetic bias in the 4 outer pole pieces can be achieved by a single permanently magnetic region on the inner pole piece.

Advantageously, the permanently magnetic region is arranged on the inner pole piece of the E-shaped stator. This is a simple way to generate a magnetic bias in all pole pieces of the stator.

Expediently, the permanently magnetic region is arranged in the transitional area of the region connecting the pole pieces of the E-shaped stator. This allows reliable transmission of the magnetic bias to the other pole pieces.

Expediently, the movable element is movably arranged by at least one bending element on a housing of the reluctance actuator. This allows simple and at the same time reliable fastening of the movable element Advantageously, the bending element has an inner and an outer region and at least two suspensions, wherein the two regions are connected to each other via the at least two suspensions. This results in an extremely reliable but flexible fastening and movement of the movable element.

Expediently, the at least one bending element is made of a resilient material, which may include of beryllium and/or a plastic or aluminum. This allows a lightweight movable element and at the same time reliable fastening of the same.

Advantageously, the movable element is directly connected to the at least one bending element, for example, to the inner region of the at least one bending element. This allows for cost effective manufacturing, direct transmission of force between bending element and movable element, and low inertia of bending element and movable element.

Expediently, the movable element and the bending element are configured in one piece. This reduces the manufacturing effort.

Expediently, the movable element and the bending element are made of ferromagnetic steel, for example, of spring steel. An advantage in this respect is the compact design, low inertia, and the position of the pivot point of the movable element near the surface.

Expediently, the bending element or the movable element is at least partially mirror coated. In this way, the respective element itself can serve as a mirror; no additional application of a mirror is required, which reduces the manufacturing effort.

Expediently, the movable element is mounted by at least one bearing, for example, in the form of a ball bearing, a point bearing in the form of a tip made of hard metal, sapphire, or the like, or in the form of a bending element, that may be located centrally to the inner or central pole piece of the stator. This is a simple and cost effective way to allow tilting movements of the movable element by defining a pivot point. In addition, forces acting in the z direction are compensated for, i.e. by forces which act substantially parallel to the pole pieces of the stator.

Advantageously, the at least one movable element is arranged at a spacing from the stator by at least one air gap. This on the one hand ensures movability; on the other hand it ensures that the magnetic circuit between the yoke or movable element and the stator still substantially completely closes.

Expediently, the stator includes four outer pole pieces, wherein one coil each is arranged at either two of the four pole pieces arranged opposite to each other. This is a simple way to allow movement of the movable element along two axes. The coils may be switched in series. If coils are arranged at all four pole pieces, two opposed coils cooperate to move the movable element about one axis. The movable element can then be tilted about two axes.

The stator is advantageously laminated. This reliably prevents eddy currents and increases the efficiency of the actuator.

Expediently, only the outer pole pieces of the stator are made of multiple insulating layers. The inner part can then just be made of ferromagnetic material, e.g. by turning from solid material.

Advantageously, the inner pole piece of the stator has a cylindrical shape. This ensures uniform tilting in each spatial direction. In addition, it can be easily manufactured, e.g. by turning.

The yoke is expediently ferromagnetic. As such, no permanent magnets are needed in the yoke or movable element, respectively, which results in a light weight of the movable element.

Advantageously, the yoke is made of steel. This allows reliable closing of the magnetic circuit by the yoke and at the same time a long service life of the same.

Expediently, the movable element is substantially configured as a circular, elliptical, or star-shaped disc. The disc shape allows for a flat design of the movable element. The pivot point of the movable element thus is near its surface. This results in a highly compact space requirement. The ratio of the diameter of the disc to its thickness may for example be between 5 and 100,000, for example, between 10 and 10,000, for example, between 100 and 1,000. When the movable element is configured as a star-shaped disc, the magnetic flux of the opposed coils is established by opposing star arms. The movable element thus has less mass.

Advantageously, the disc is formed symmetrically along at least one axis. This allows simple manufacture and at the same time reliable tilting of the movable element.

Expediently, four suspensions are arranged, wherein the fastening points of the respective suspensions are located at the inner region and at the outer region at an offset of 90° in the peripheral direction of the movable element. On the one hand, this reliably restricts movement along undesired degrees of freedom; on the other hand the negative stiffness of the actuator having little stiffness is compensated for in two desired directions/degrees of freedom.

Advantageously, the shape of the at least one suspension is substantially at least partially configured in accordance with the outer contour of the inner region of the bending element. This facilitates a compact and symmetrical design of the actuator as a whole.

Expediently, a feedback and control device is arranged near the actuator system and connected to the reluctance actuator for controlling the movement of the movable element about at least one axis. This is a simple and reliable way of checking and controlling the deflection of the movable element.

Advantageously, the feedback and control device includes a position measuring device, for example, an angular position measuring device, a current amplifier device or voltage amplifier device, and/or an output current measuring device. These devices allow measurement of variables for operating and controlling the actuator.

Advantageously, the yoke forms a substantially lateral outer termination of the actuator. This makes the required installation space compact.

Other important features and advantages of the disclosure are apparent from the dependent claims, from the drawings, and from the associated description of the figures with reference to the drawings.

It will be appreciated that the features mentioned above and the features to be explained below may be used in the combinations described as well as in any other combinations or by themselves, without deviating from the scope of the disclosure.

BRIEF DESCRIPTION OF THE DRAWINGS

Example designs and embodiments of the disclosure are shown in the drawings and will be explained in the description below, wherein like reference symbols refer to like or similar or functionally identical components or elements. Wherein

FIG. 1b shows a cross sectional view of a reluctance actuator according to an embodiment of the disclosure;

DETAILED DESCRIPTION

Figure 1A:
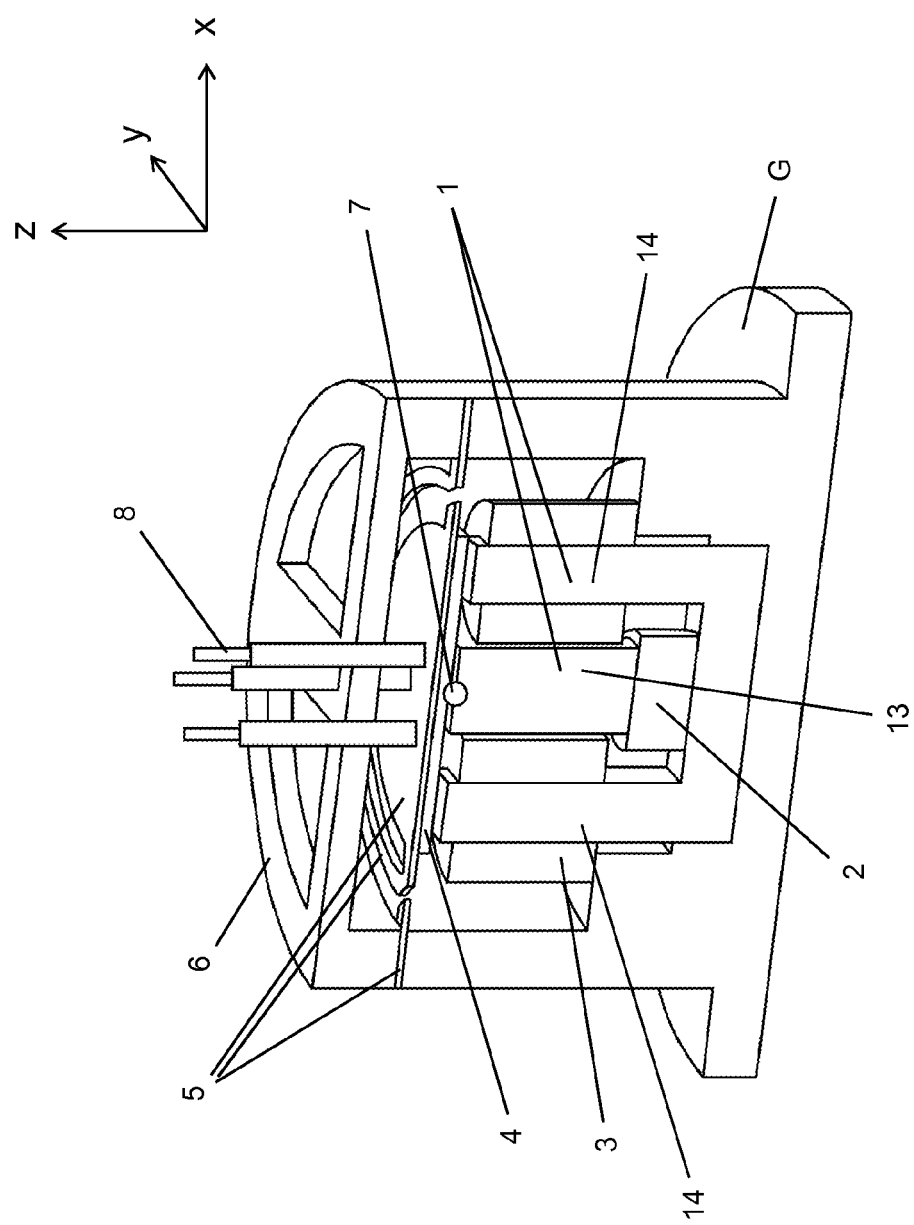
FIG. 1a shows a cross sectional view of a reluctance actuator according to an embodiment of the disclosure.

FIG. 1a shows a cross sectional view of a reluctance actuator according to an embodiment of the disclosure;

FIG. 1a shows a cross sectional view of a hybrid actuator along a system axis together with some of its components.

The reluctance actuator substantially includes a cylindrical housing G. An E-shaped stator 1 having a permanent magnet 2 arranged at its inner pole piece 13 and one coil 3 each at its outer pole pieces 14 is arranged in the housing G. A yoke for closing the magnetic circuit and configured as a movable element 4 is arranged on the top side of the stator 1, which element is directly connected to a bending element 5 or a restoring element, respectively, and said bending element limits the movement of the movable element 4 with respect to three degrees of freedom. Furthermore, a ball bearing 7 which determines the pivot point of the movable element 4 and limits the movement of the movable element 4 by another degree of freedom is arranged on the top end of the inner pole piece 13 of the stator 1.

The individual pole pieces 13, 14 of the stator 1 of the reluctance actuator, which is E-shaped along an axis, are interconnected below the permanent magnet 2, such that a single magnetic circuit is created and a single permanent magnet 2 may subject the entire system to a magnetic bias. To illustrate the basic principle of the embodiment of the disclosure, holes 6 are arranged on the outer circumference above the bending element 5 at the housing G of the actuator 1, 2, 3, 4, 5, 7, which holes may for example be provided for fastening sensors. An example of such sensors are eddy current sensors 8.

FIG. 1b shows a cross sectional view of a reluctance actuator according to an embodiment of the disclosure.

FIG. 1b substantially shows a reluctance actuator according to FIG. 1a. Unlike the reluctance actuator according to FIG. 1a, the sensors 8 are not shown in the reluctance actuator according to FIG. 1b, but a fastening ring 17 is shown with which the bending element 5 is fastened to the housing G.

Figure 2:
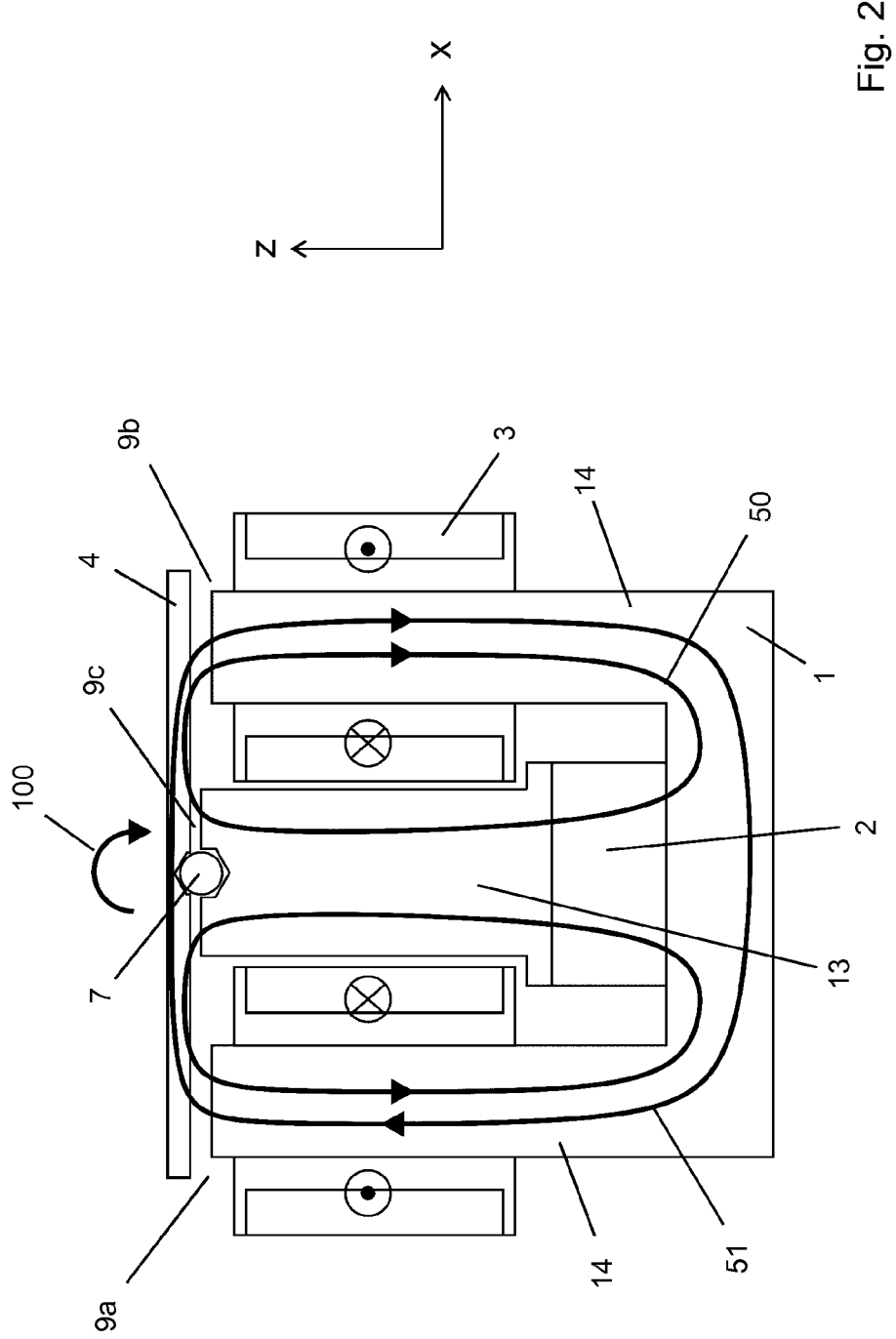
FIG. 2 schematically shows the mode of action of a reluctance actuator according to an embodiment of the disclosure.

FIG. 2 schematically shows the mode of action of a reluctance actuator according to an embodiment of the disclosure.

On the inner pole piece 13 of the stator 1, a permanent magnet 2 is arranged which generates a uniform magnetic bias flux which flows through the center, the inner pole piece 13 of the ferromagnetic stator 1, a central air gap 9c formed by the ball bearing 7 between the inner pole piece 13 and the movable element 4, and through the ferromagnetic movable element 4 and returns via the working air gaps 9a, 9b and the left or right outer pole piece 14 of the stator 1, respectively. The uniform magnetic bias flux is shown by the line 50 in FIG. 2.

When the movable element 4 is in its zero position/initial position/undeflected position, the uniform magnetic bias flux flows in equal shares through the left and right working air gaps 9a, 9b, such that the net torque 100 acting on the movable element 4 substantially equals zero, with the proviso that no current is flowing through the actuator coils 3.

The actuator coils 3 are switched in series, such that a respective current flow through the coils 3 generates a magnetic flux, shown by the line 51 in FIG. 2, which flows through the outer pole pieces 14 of the stator 1, the movable element 4, and the working air gaps 9a, 9b, either clockwise or counterclockwise depending on the direction of the current in the coils 3. Since the permanent magnet 2 represents a high-ohmic magnetic resistance (reluctance) for external magnetic fields, the magnetic flux of the coils 3 more likely flows through the outer pole pieces 14 than through the inner pole piece 13 of the stator 1. The uniform magnetic bias flux 50 and the time-varying magnetic coil flux 51 overlap in the two working air gaps 9a, 9b. This results in an increased overall flux in the right working air gap 9b, since both magnetic fluxes 50, 51 flow in the same direction, and in a reduced magnetic flux in the working air gap 9a, such that a net torque 100 acts clockwise on the movable element 4. When reversing the direction of current in the coils 3, the magnetic flux of the coils is reversed as well and causes a net torque 100 acting counterclockwise on the movable element 4.

If there is no coil current, the distribution of the magnetic bias flux via the working air gaps 9a, 9b is determined by the position of the movable element 4 and the resulting reluctance. In the deflected state, a higher magnetic flux will flow through the smaller air gap 9a, 9b and an increased torque 100 acting on the movable element 4 is generated in the direction of the original deflection. This is synonymous with a negative stiffness of the actuator and shows that the operating principle of the actuator itself is inherently unstable due to the existing permanent magnet 2. The bending element 5 is therefore configured to compensate for the negative stiffness of the actuator or to stabilize the inherently unstable operating principle, respectively. Such a bending element 5 is shown in FIGS. 3 and 4.

Figure 3:
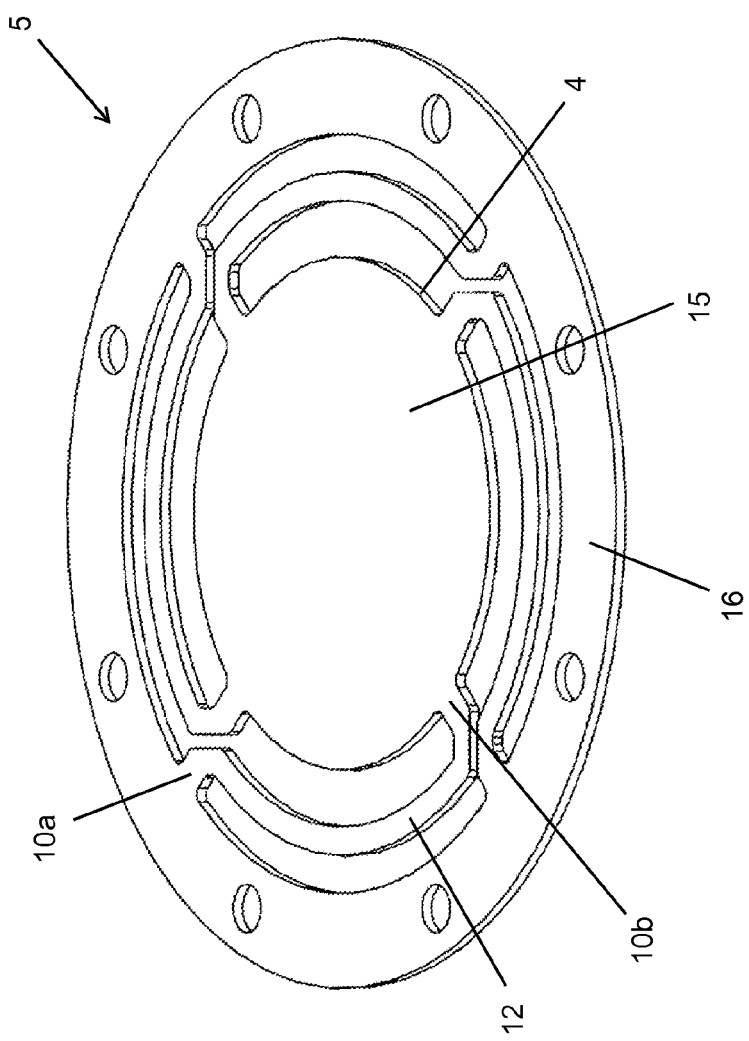
FIG. 3 shows a bending element according to an embodiment of the disclosure in the undeflected state.
Figure 4:
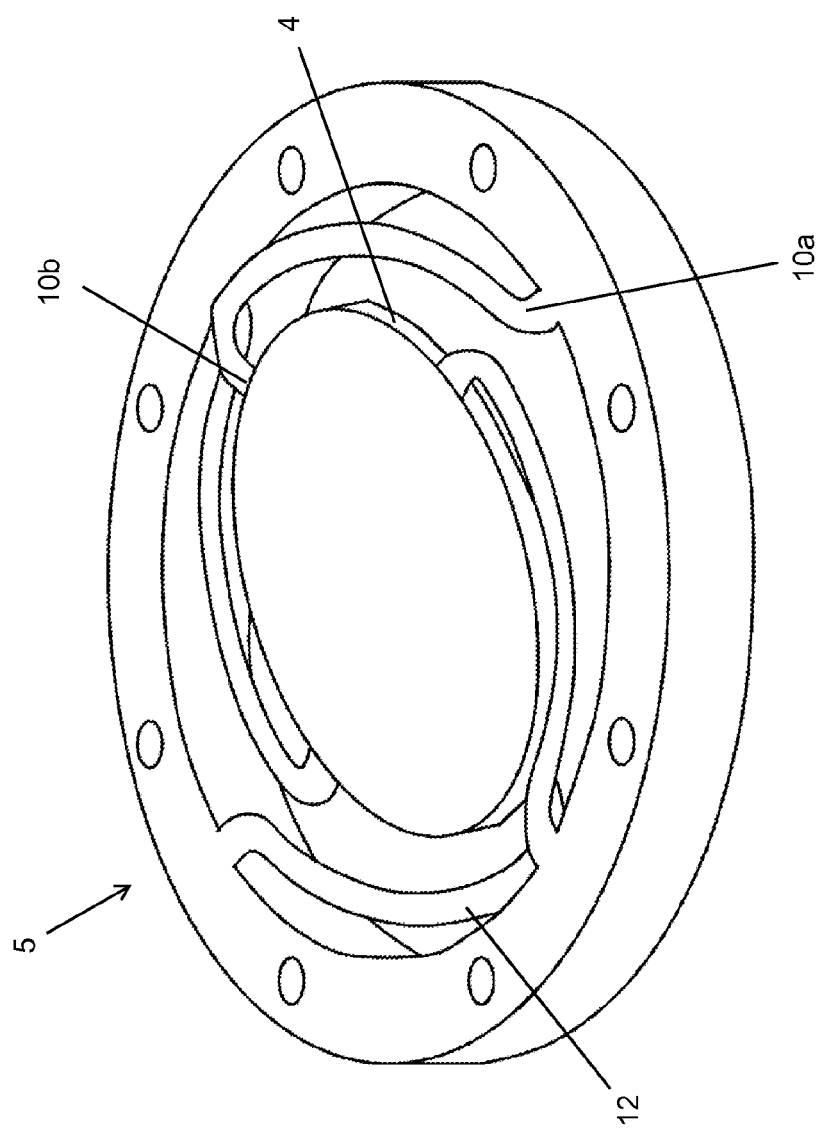
FIG. 4 shows the bending element according to FIG. 3 in the deflected state.

FIG. 3 shows a bending element according to an embodiment of the disclosure in the non-deflected state, and FIG. 4 shows a bending element according to FIG. 3 in the deflected state.

FIG. 3 and FIG. 4, respectively, show a bending element 5 at the bottom side of which the movable element 4 is arranged and directly connected to the bending element 5. The bending element 5 is substantially configured according to the shape of the movable element 4, or both are matched to each other accordingly. Both elements 4, 5 are substantially disc-shaped and circular in FIGS. 3, 4. The bending element 5 includes on its outer side a fastening ring 16 for fastening the bending element 5 to the housing G of the actuator. The inner region 15 of the bending element 5 is formed by a disc, as explained above. The inner region 15 and the outer region 16 of the bending element 5 are interconnected via suspensions 12 which are symmetrically distributed over the periphery. The fastening points 10a of the suspension 12 on the disc 5 and the fastening points 10b of the suspension 12 at the outer region 16 are each arranged at a 90° offset in the peripheral direction, such that the suspensions substantially have the form of quadrants.

FIG. 4 shows a respective deflection of the movable inner region 15 together with the movable element 4. The ferromagnetic movable element 4 is directly connected to the bending element 5. Due to the magnetic bias by the permanent magnet 2, high offset forces are acting in the z direction. These would damage the bending element 5, which cannot be formed with sufficient stiffness in the z direction without also adversely increasing the stiffness in the two desired rotational degrees of freedom for tilting. To avoid this, a ball bearing 7 may act to compensate the forces in the z direction and to fasten the pivot point. The bending element 5 may be made of aluminum and, as explained, limits the translational degrees of freedom in the x and y directions and the rotational degree of freedom about the z axis. In other words, only rotation about the x and y axes—tilting— is facilitated. Inertia is minimized due to the direct connection of the bending element 5 and the movable element 4.

Furthermore, the stator 1 may on its outer pole pieces 14 include a layered structure of multiple insulating materials to prevent the emergence of eddy currents and their effects on bandwidth, i.e. a reduction of the same. Furthermore, the reluctance actuator may be provided with a control device to determine, control, or regulate the position of the movable element 4. This device can determine, control, or regulate the position with respect to each axis. To this end, an amplifier as well as a control device for the current of the coils and a control/monitoring device for the tilt angle in each direction of the actuable axes of the movable element 4.

FIGS. 5a, b each show a cross sectional view of a reluctance actuator according to an embodiment of the disclosure.

Figure 5B:
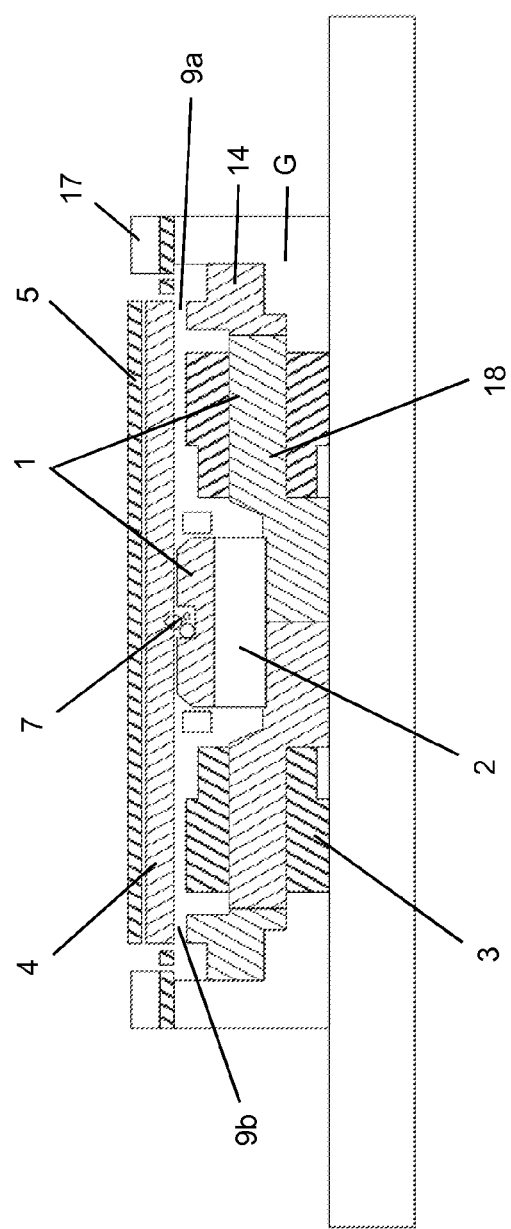
FIGS. 5a, b each show a cross sectional view of a reluctance actuator according to an embodiment of the disclosure.

FIG. 5a and FIG. 5b each show a reluctance actuator according to FIG. 1b. Unlike the reluctance actuator according to FIG. 1b, the pole pieces 14 in the reluctance actuators according to FIGS. 5a and 5b substantially extend horizontally to the bottom plate of the housing G. The axes of coils 3 are also arranged horizontally around the pole pieces 14. The pole piece 14 in FIG. 5a is formed in one piece, the one in FIG. 5b is a two-piece component, wherein only the outer end of a core 18 is called a pole piece 14. The pole piece 14 is adjusted such that the magnetic flux is suitably conducted to the yoke or movable element 4, respectively. The core 18 with the pole piece 14 may either be formed in one piece (see FIG. 5a) or in two pieces (see FIG. 5b), as explained above. In FIG. 5b, the pole piece 14 is arranged at or fastened to the core 18. In other words, the pole piece 14 is directed "upwards" in the end region in this "lying flat" design, such that the magnetic field is directed towards the movable element 4. This embodiment thus allows a flat design.

Figure 6:
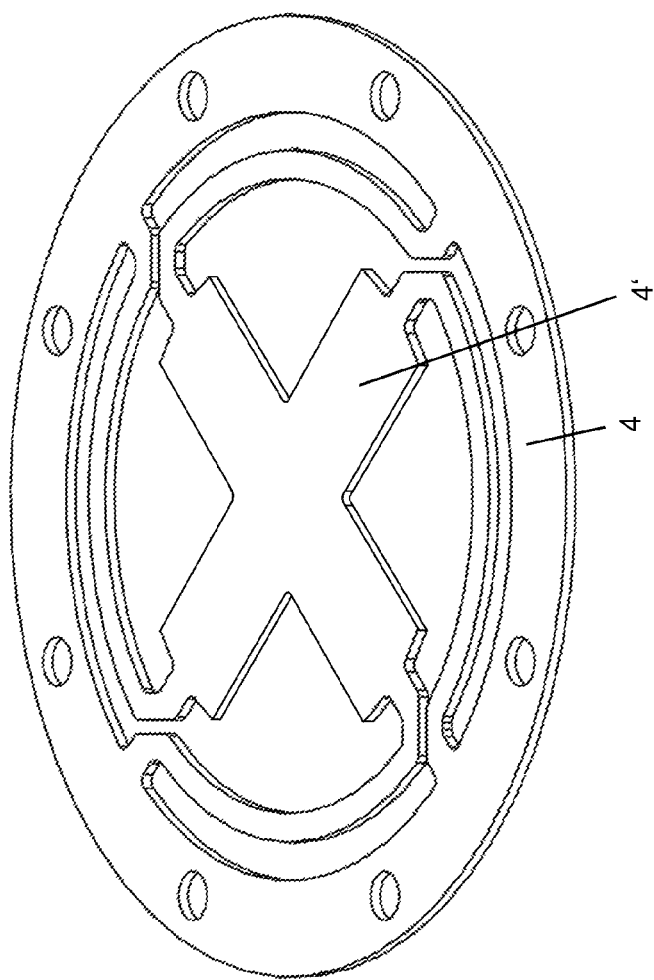
FIG. 6 shows a bending element according to an embodiment of the disclosure in the undeflected state.

FIG. 6 shows a bending element according to an embodiment of the disclosure in the undeflected state.

FIG. 6 shows a bending element 4 which is star-shaped, here with beams 4' in the form of a cross with beams at 90°. The four beams 4' or arms of the cross are substantially arranged above the respective pole piece 14 when the bending element 4 is assembled to allow tilting about two axes. The fastening points of the suspensions for the bending element 4 and the fastening points on the outer region are arranged at a 90° offset in the peripheral direction like in FIG. 3 or FIG. 4, respectively.

This disclosure provides at least the following advantages:

- a small displaced mass, resulting in a high bandwidth, since the movable element is only made of the ferromagnetic yoke that closes the magnetic circuit, without permanent magnets, solenoid plungers, etc.
- the movable element is not seated within the yoke that closes the magnetic circuit but forms a termination of the actuator on one side, which has the advantage that the existing installation space is very well utilized, since
  - there are no projections, e.g. of the yoke or coils, i.e. the mover is located almost at the outermost point of the entire actuator, such that no component of the actuator projects beyond it,
  - large lateral coverage of the mover with respect to the yoke and coils, i.e. the ratio of usable surface of the mover to the overall diameter of the actuator is very high,
  - flat design of the mover results in a pivot point of the mover almost on the surface of the movable element (a pivot point on the surface would be ideal),
- the E-shaped cross section of the stator allows a small overall diameter of the actuator (unlike a conventional C-shaped stator)

The disclosure thus provides a compact, highly dynamic actuator, which can be used in manifold applications, including, for example, fast tilting of mirrors for scanning optical systems in the fields of optical communication, scan measuring technology, target tracking, etc.

Although the disclosure was described with reference to example embodiments, it is not limited to these and can be modified in manifold ways. In other words, it should be expressly noted that the exemplary embodiments of the device according to the disclosure described above are only used to explain the claimed teachings but do not limit these teachings to these exemplary embodiments.

For further advantageous embodiments of the device according to the disclosure and to avoid repetition, see the general part of the description above and the appended claims.

LIST OF REFERENCE SYMBOLS

1 Stator
2 Permanent magnet
3 Actuator coil(s)
4 Movable element/yoke
4' Beams/arms
5 Bending element
6 Hole(s)
7 Ball bearing
8 Eddy current sensor
9a, 9b, 9c Air gap
10a, 10b Fastening point
12 Suspension
13 Inner pole piece
14 Outer pole piece
15 Inner region
16 Outer region
17 Fastening ring
17a Screw
18 Core
50 Magnetic bias flux
51 Magnetic coil flux
100 Torque direction
G Housing

The invention claimed is:

1. A reluctance actuator, including
a magnetizable stator;
at least one coil that is configured to generate a magnetic field in the stator; and
a yoke configured to at least partially close the magnetic flux of the stator,
wherein the yoke is configured as a movable element that is configured to perform lifting/tilting movements;
a housing of the reluctance actuator,
a control device for the movable element, and
at least one bending element, wherein the movable element is movably connected to the housing of the reluctance actuator by the at least one bending element, wherein a tilt angle of a deflection of the movable element is controlled by the control device.

2. The reluctance actuator according to claim 1, wherein the stator comprises a permanently magnetic region.

3. The reluctance actuator according to claim 2, wherein a cross section of the stator is configured as an E shape along at least one axis with two outer and one inner pole pieces.

4. The reluctance actuator according to claim 3, wherein the stator has an E-shaped cross section along two axes, the two axes forming a specific angle relative to one another.

5. The reluctance actuator according claim 3, wherein the at least one coil comprises a coil axis, the coil axis being substantially perpendicular to a deflection direction of the movable element.

6. The reluctance actuator according to claim 4, wherein a first inner pole piece of the E-shaped stator along a first axis of the two axes is identical to a second inner pole piece along a second axis of the two axes.

7. The reluctance actuator according to claim 3, wherein the permanently magnetic region is located on the inner pole piece of the E-shaped stator.

8. The reluctance actuator according to claim 7, wherein the permanently magnetic region is located in a transitional area of a region connecting the pole pieces of the E-shaped stator.

9. The reluctance actuator according to claim 1, wherein the bending element has an inner region and an outer region and at least two suspensions, wherein the inner and outer regions are connected to each other via the at least two suspensions.

10. The reluctance actuator according to claim 1 wherein the at least one bending element is made of aluminum and/or of titanium.

11. The reluctance actuator according to claim 9, wherein the movable element is directly connected to the at least one bending element.

12. The reluctance actuator according to claim 1 wherein the movable element and the bending element are formed as one piece.

13. The reluctance actuator according to claim 1 wherein the movable element and the bending element are made of ferromagnetic steel.

14. The reluctance actuator according to claim 1 wherein the bending element or the movable element are at least partially mirror-coated.

15. The reluctance actuator according to claim 3, further comprising a mounting device configured to mount the movable element, wherein the mounting device may include at least one bearing, a ball bearing, a point bearing in the form of a tip made of a material including hard metal or sapphire or in the form of a bending beam.

16. The reluctance actuator according to claim 1 wherein the movable element is separated from the stator by at least one air gap.

17. The reluctance actuator according to claim 1, wherein the stator comprises four outer pole pieces, wherein the at least one coil includes first and second coils, the first and second coils located on first and second respective pole pieces of the four pole pieces, wherein the first and second pole pieces are opposite one another.

18. The reluctance actuator according to claim 3, wherein the stator is laminated.

19. The reluctance actuator according to claim 18, wherein only the outer pole pieces of the stator are made of multiple insulating layers.

20. The reluctance actuator according to claim 3, the inner pole piece of the stator is cylindrical.

21. The reluctance actuator according to claim 1, wherein the yoke is ferromagnetic.

22. The reluctance actuator according to claim 1, wherein the yoke is made of steel.

23. The reluctance actuator according to claim 1, wherein the movable element is configured as a circular, elliptical, or star-shaped disc.

24. The reluctance actuator according to claim 23 wherein the movable element is configured as a star-shaped disc that is symmetrical along at least one axis.

25. The reluctance actuator according to claim 9, wherein the at least two suspensions include four suspensions with each suspension having first and second fastening points, wherein the first and second fastening points of each suspension are located at the inner region and at the outer region, respectively, of the movable element, each suspension having an angular offset of 90° in a peripheral direction relative to neighboring suspensions.

26. The reluctance actuator according to claim 25, wherein a shape of the at least one suspension is substantially at least partially configured in accordance with an outer contour of the inner region and/or the movable element.

27. The reluctance actuator according to claim 1, wherein the yoke forms a substantially lateral outer termination of the actuator.

28. An actuator system, comprising:
a non-magnetic housing; and
a reluctance actuator, including:
 a magnetizable stator;
 at least one coil that is configured to generate a magnetic field in the stator; and
 a yoke configured to at least partially close the magnetic flux of the stator,
 wherein the yoke is configured as a movable element that is configured to perform lifting/tilting movements,
 a control device for the movable element; and
 at least one bending element, wherein the movable element is movably connected to the non-magnetic housing of the reluctance actuator by the at least one bending element, wherein a tilt angle of a deflection of the moveable element is controlled by the control device,
 wherein the reluctance actuator is at least partially located in the non-magnetic housing.

29. The actuator system according to claim 28, further comprising a feedback and control device that is connected to the reluctance actuator and configured to control movement of the movable element about at least one axis.

30. The actuator system according to claim 29, wherein the feedback and control device further comprises a position measuring device.

31. A method of performing lifting/tilting movements of a movable element of a reluctance actuator, the reluctance actuator including:

A magnetizable stator, at least one coil configured to generate a magnetic field in the stator, and a yoke configured to at least partially close a magnetic flux, wherein the yoke is configured as movable element that generates lifting/tilting movements based on the magnetic field, a control device for the movable element and at least one bending element movably connecting the movable element to a housing;

the method comprising:
controlling a current in the at least one coil to thereby generate a magnetic field in the stator,
generating a lifting/tilting movement of the movable element based on movement of the yoke due to interaction between the magnetic field and the yoke, wherein a tilt angle of a deflection of the movable element is controlled by the control device.

32. The reluctance actuator according to claim 4, wherein the angle between the two axes is 90°.

33. The reluctance actuator according to claim 5, wherein the stator is at least partially located inside the coil.

34. The reluctance actuator according to claim 11, wherein the movable element is directly connected to the inner region of the at least one bending element.

35. The reluctance actuator according claim 13, wherein the movable element and the bending element are made of spring steel.

36. The reluctance actuator according to claim 15, wherein the mounting device is a bending beam configured to be located centrally to the inner pole piece of the stator.

37. The actuator system according to claim 28, wherein the non-magnetic housing includes aluminum.

38. The actuator system according to claim 30, wherein the position measuring device is one of an angular position measuring device, a current amplifier device or voltage amplifier device, and/or an output current measuring device.

* * * * *